United States Patent [19]

Kawabata

[11] Patent Number: 4,580,542

[45] Date of Patent: Apr. 8, 1986

[54] FUEL HEATER AND FUEL CONTAMINATION DETECTING APPARATUS

[75] Inventor: Yasuhiro Kawabata, Anjo, Japan

[73] Assignee: Aisin Seiki Kabushiki Kaisha, Kariya, Japan

[21] Appl. No.: 704,212

[22] Filed: Feb. 22, 1985

[30] Foreign Application Priority Data

Feb. 24, 1984 [JP] Japan ................................ 59-024558

[51] Int. Cl.⁴ ............................................... F02G 5/00
[52] U.S. Cl. .................................... 123/557; 122/549; 210/184
[58] Field of Search ................ 123/557, 549; 210/184, 210/181

[56] References Cited

U.S. PATENT DOCUMENTS

| 4,092,963 | 6/1978 | Vrooman | 123/549 |
| 4,473,054 | 9/1984 | Marcoux et al. | 123/557 |
| 4,502,955 | 3/1985 | Schaupp | 123/557 |

Primary Examiner—E. Rollins Cross
Attorney, Agent, or Firm—Oblon, Fisher, Spivak, McClelland & Maier

[57] ABSTRACT

A fuel heater and fuel contamination detecting apparatus for automotive vehicles which includes a casing member in the form of a heating body made of a compound which is manufactured by mixing a thermoplastic resin and short metal fibers such as aluminum, copper, silver or alloys of these metals. The resistance of the heating body becomes infinite when the temperature rises above a predetermined level. Also provided are a reed switch and a magnet for activating the read switch and which is attached to a float. The float is in turn located in a reservoir formed in the casing member.

4 Claims, 2 Drawing Figures

FUEL HEATER AND FUEL CONTAMINATION DETECTING APPARATUS

BACKGROUND OF THE INVENTION

1. Field of the Invention

This invention relates to a fuel heater and fuel contamination detecting apparatus and, more particularly, to an apparatus of this type for automotive vehicles.

2. Description of the Prior Art

A fuel heater for automotive vehicles has previously been disclosed in Japanese utility model laid-open application No. 59 (1984)-13665 issued Jan. 27, 1984. As explained in the above laid-open application, a heater is embedded in the device, with the result being that the device is partially heated and that a mounting portion of the heater needs to use materials adapted to have an insulating property and a heat-resisting property. Furthermore, it is necessary to utilize a heater for heating fuel within a filter.

SUMMARY OF THE INVENTION

An object of the present invention is to eliminate the disadvantages of prior art fuel heaters and to provide an apparatus which can detect the existence of water or other contaminate liquids in the fuel.

More particularly, it is an object of the present invention to provide a fuel heater and fuel contamination detecting apparatus wherein a casing functions as a heating body.

Another object of the present invention is to provide a new and improved fuel heater and fuel contamination detecting apparatus which utilizes comparatively simple mechanical components and is economical to manufacture.

In one illustrative embodiment of the present invention, there is provided a fuel heater which includes a casing formed by a heating body made of a compound which is manufactured by mixing a thermoplastic resin and short metal fibers. Since the metal fibers are in the form of short fibers, the resistivity of the metal fibers increases abruptly at the transfer temperature even when the initial resistance value of the metal fibers is small. Thus, the specific resistivity is very large and the PTC curve is acceptable with respect to the increase and decrease of temperature. The result is that a hysteresis curve is not produced and the metal fibers have a positive coefficient of temperature wherein the resistivity does not decrease in the presence of a high temperature. Furthermore, the fuel heater can be used in a wide range of temperatures by selecting a thermoplastic resin. The casing can function as a heating body, thereby heating the fuel within the casing.

In accordance with one feature of the present invention, since the casing itself is a heating body, electric terminals can be inserted into the casing upon the forming of the casing. The casing has a high degree of freedom in the forming thereof, thereby allowing for easy formation of the casing so that the casing may be of a form adapted for the place of installation. Therefore, the fuel heater according to the present invention does not need a casing for a heating body, an insulator, a seal member etc., which have been used in prior art fuel heaters, whereby the fuel heater is simple in construction and can be economically manufactured.

In accordance with another feature of the present invention, when the temperature rises beyond a predetermined value, the resistance of the heating body becomes infinite thereby automatically interrupting the electric current, with the result that the fuel heater does require the use of a temperature sensor, a control electric circuit, etc.

The above noted as well as further objects and features of the invention will be understood more clearly and fully from the following detailed description of a preferred embodiment thereof, when read with reference to the accompanying drawing.

DETAILED DESCRIPTION OF THE PREFERRED EMBODIMENT

Figure 1:
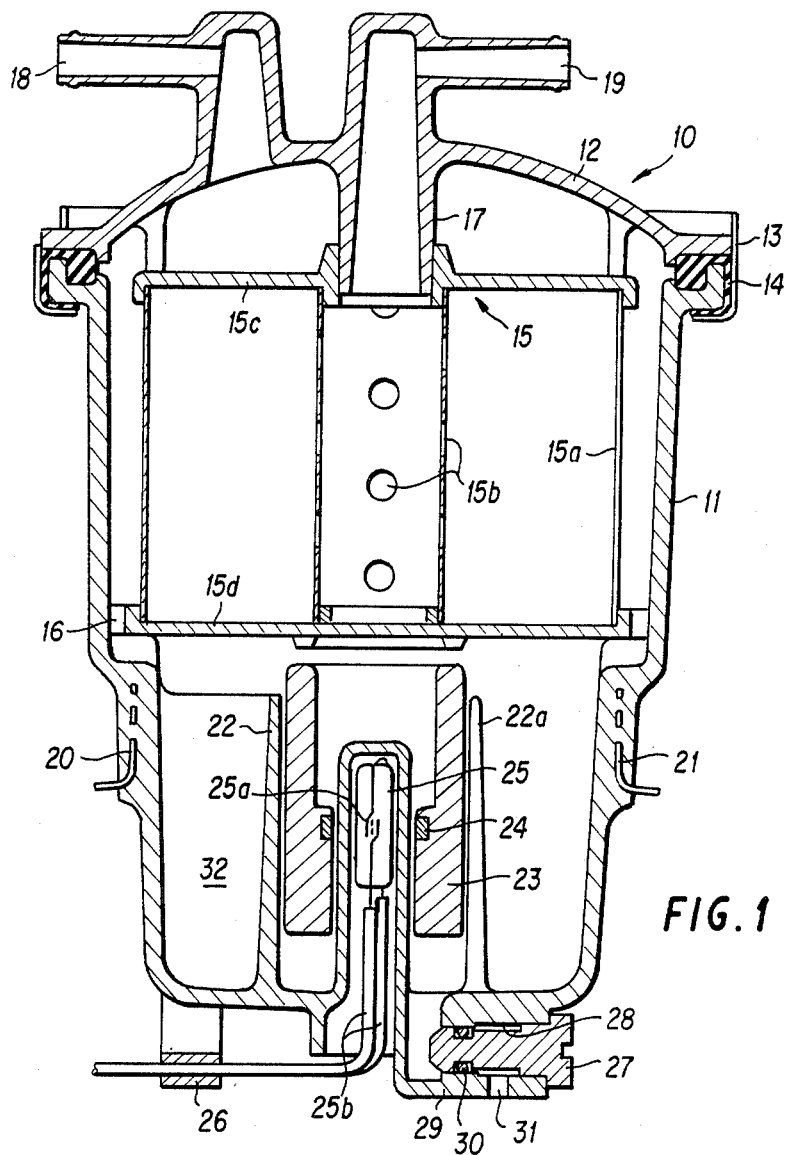
FIG. 1 is a vertical sectional view of a fuel heater and fuel contamination detecting apparatus constructed in accordance with one illustrative embodiment of the invention.

Referring now to FIG. 1, there is shown a fuel heater and fuel contamination detecting apparatus 10 which includes a casing member 11 in the form of a heating body made of a compound which is manufactured by mixing a thermoplastic resin and short metal fibers. As the short metal fibers, for example aluminum, copper, silver and alloys of these metals are generally used. The short metal fibers are required to be 1 mm to 15 mm in length and $40\mu$ to $120\mu$ in diameter. As the thermoplastic resin, for example polyethylene, polypropylene, polyoxymethylene, polyisobutylene, polyfluoroethylene, polyamide, polyester, polyether and copolymers of these resins are generally used. When the temperature rises from the normal temperature level and reaches the transfer temperature level, these thermoplastic resins change from a crystalline substance to a noncrystalline substance. At this time, the thermoplastic resin increases abruptly in volume, thereby cutting off the electric conductive passage chains of the short metal fibers contained in the thermoplastic resin and enlarging the distances between the short metal fibers.

A cover member 12 made of an aluminum die cast casting is connected through a sealing and insulating member 14 to the casing member 11 by a fastening member 13. A filter 15 located within the casing member 11 is provided with an inflow side surface 15a, a discharge port 15b, a cover plate 15c and a bottom plate 15d. A groove 16 is formed between the casing member 11 and the filter 15. The cover member 12 is provided with a filter guide 17, an inlet port 18 and an outlet port 19. A pair of terminals 20, 21 used as a heater are embedded in the casing member 11. A float 23 is slidably disposed within a guide portion 22 which is formed on the casing member and is provided with at least one narrow groove 22a. A permanent magnet 24 is fixed in the float 24 so that the magnet 24 may cooperate with a switch portion 25a of a reed switch 25. The switch portion 25a is electrically connected to a suitable electric source through lead wires 25b supported by a supporting member 26 and can generate a signal to an alarm to be recognized by the operator in a conventional manner (i.e., light, buzzer, etc.) upon accumulation of a contaminate fluid (e.g., water) in a reservoir 32. A screw 27 extends through a threaded aperture 28 in the bottom end 29 of the casing member 11. An O-ring 30 is disposed between the screw 27 and the inner surface of the bottom end 29 provided with a small hole 31.

In operation, when the fuel (i.e., a light oil or gasoline) flows into the fluid reservoir 32 from the inlet port 18, fluid (e.g., moisture) having a large specific gravity remains in the fluid reservoir 32 and only light oils flow out of the outlet port 19 through the inflow side surface 15a and the outflow port 15b of the filter 15. When the fluid gathers in the reservoir 32, the float 23 which is heavier than the light oils and lighter than the fluid is gradually lifted. When the float 23 reaches the positioned shown in FIG. 1, the switch portion 25a of the reed switch 25 is closed by the action of the magnet 24, thereby warning the operator of danger. If the O-ring 30 is removed by turning the screw 27, the water flows out of the small hole 31.

Figure 2:
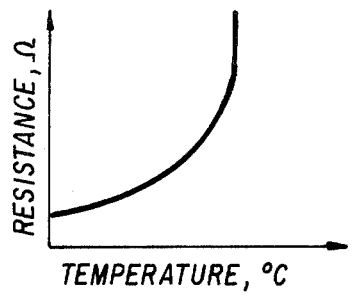
FIG. 2 is a temperature characteristic diagram of the resistance of the heating body.

On the other hand, if paraffin is contained in the light oils and solidifies upon being exposed to a cold temperature, the filter 15 becomes clogged. Thus, it is necessary to provide a heater so as to prevent the paraffin from solidifying. From FIG. 2 showing a temperature characteristic diagram of the resistance of the heating body and it will be apparent that the resistance becomes infinite when the temperature rises above a predetermined level.

It will be apparent to those skilled in the art that fuel heater and fuel contamination detecting appartus of the invention may be constructed in a variety of ways without, however, departing from the scope and spirit of the appended claims.

What is claimed as new and desired to be secured by Letters Patent of the United States is:

1. A fuel heater and fuel contamination detecting apparatus for automotive vehicles, said apparatus comprising:
   a casing member in the form of a heating body which comprises a thermoplastic resin and a plurality of short metal fibers and which forms a fluid reservoir therein;
   a filter located within said casing member;
   a pair of terminals embeded in said casing member for selectively heating said casing;
   a reed switch located proximate to a bottom portion of said casing and being connected to an alarm for activating said alarm upon closing of said reed switch;
   a float slidably disposed in said fluid reservoir formed in said casing member; and
   a permanent magnet fixed to said float, said magnet cooperating with said reed switch to automatically close said reed switch due to shifting of said float caused by contamination of said fuel with a liquid.

2. A fuel heater and fuel contamination detecting apparatus according to claim 1 wherein said short metal fibers are made of aluminum, copper, silver or alloys thereof.

3. A fuel heater and fuel contamination detecting apparatus according to claim 2, wherein said short metal fibers are 1 mm to 15 mm in length and 40$\mu$ to 120$\mu$ in diameter.

4. A fuel heater and fuel contamination detecting apparatus according to claim 1 wherein said thermoplastic resin further comprises polyethylene, polypropylene, polyoxymethylene, polyisobutylene, polyfluoroethylene, polyamide, polyester, polyether or copolymers of said these resins.

* * * * *